Patented Sept. 24, 1929

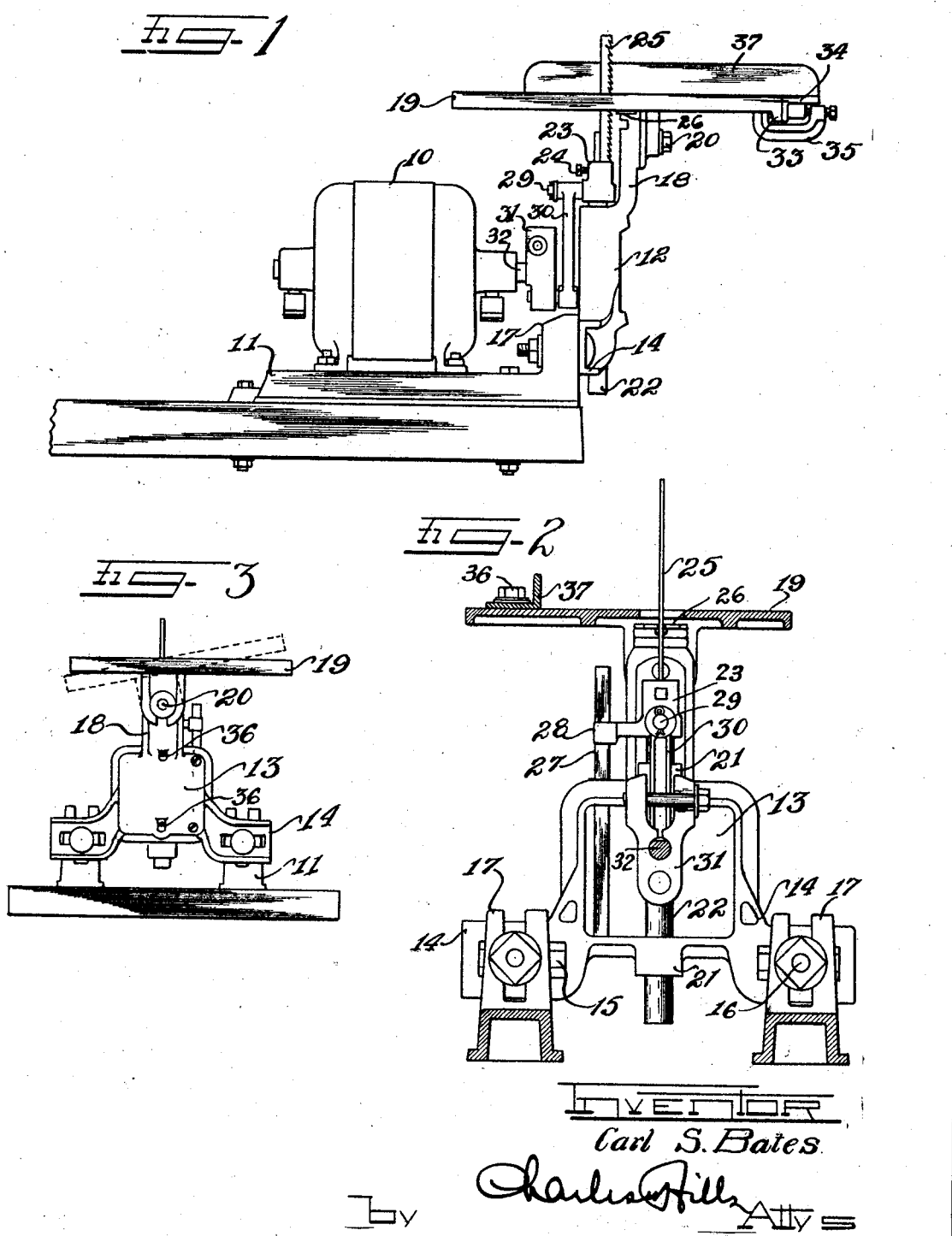

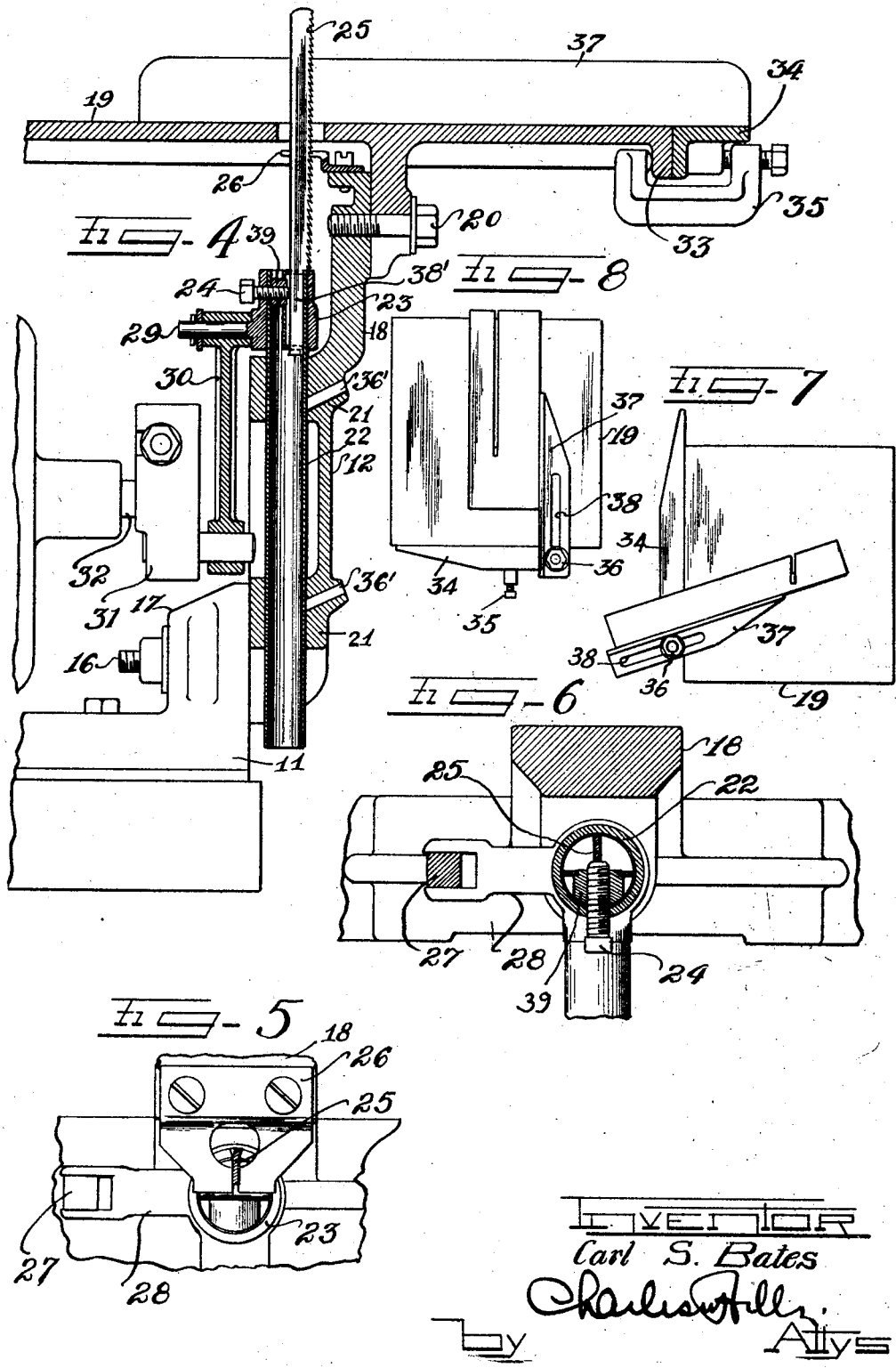

1,729,324

UNITED STATES PATENT OFFICE

CARL S. BATES, OF CHICAGO, ILLINOIS, ASSIGNOR TO INTERNATIONAL STAMPING CO., OF CHICAGO, ILLINOIS, A CORPORATION OF ILLINOIS

HIGH-SPEED RECIPROCATING SAW

Application filed September 16, 1927. Serial No. 219,340.

My invention relates particularly to scroll or jig saws, but I have extended the field of such saws, particularly in the small and light sizes, by employing a saw blade of high cutting speed.

By employing a short reciprocating saw blade of high speed directly connected to a motor, I can readily cut a comparatively thick plank or the like without the necessity of supporting the saw blade at both of its ends, and without the necessity of bracing on or in the saw table anything to guide the saw blade. The table is therefore inexpensive; it may be readily tilted; and because it has an unobstructed working surface, one may use the saw for mortising, routing, etc.

It is an object of my invention to provide a light motor-operated saw employing a high speed reciprocating blade supported at one end yet capable of quickly and efficiently cutting not only small but relatively large stock.

It is also an object of my invention to provide a light motor-operated high speed reciprocating saw having a saw table entirely free of saw guiding means so that it may be readily tilted and so that the saw may be readily applied to such purposes as routing and mortising as well as the other and more obvious applications of a saw of this type.

On the drawings:

Figure 1 is a side view in elevation of a device embodying features of the present invention, shown equipped with a motor.

Figure 2 is a rear elevational view of the device with parts in section.

Figure 3 is a front view in elevation of the device.

Figure 4 is a fragmentary side elevational view with parts in section.

Figure 5 is a fragmentary plan view with the table removed to show the saw guide.

Figure 6 is a fragmentary plan view with the table removed and parts in section to show the saw guiding means and the blade fastening means.

Figure 7 is a plan view of the table and material guiding means.

Figure 8 is a view similar to Figure 7 showing a different adjustment of the guiding means.

As shown on the drawings:

Numeral 10 indicates a motor alignably supported on a base or platform 11 by bolts entered in slots, not shown, in the platform, or by any other suitable means.

The numeral 12 indicates a pedestal having a shallow box portion 13 and depending and outturned arms 14 preferably integral therewith, the arms, in this instance, being slotted at 15 so that they may be adjustably secured by bolts 16 to slotted lugs 17 on one end of the platform 11 whereby the pedestal may be vertically adjusted to suit various sizes of motors.

An upwardly extending arm 18 integral with the box portion of the pedestal 12 supports a saw table 19 which is removably secured thereto by a screw or bolt 20 and so that the table may be tilted to any desired angle as indicated by the dotted lines in Figure 3.

Apertured bosses 21 are formed on the upper and lower sides of the box-like portion 13 and a reciprocatory tube or shaft 22 is slidably positioned therein. Obviously suitable bearing means may be inserted in the apertured bosses if so desired.

A cap 23 is secured to the upper end of the tube 22 by a screw 24 so that it moves with the tube.

The cap 23 is adapted to securely hold one end of a saw blade 25, the other end of which extends through a suitable opening in the table 19 and is preferably unsupported. The blade 25 is guided by a guide 26 positioned on the arm 18, and below the table 19, so that the table is free of obstructions.

The blade 25 is reciprocated at a high speed by means to be discussed later, and because of its high speed, it becomes rigid enough to enable it to saw through relatively thick material and to be used for routing, mortising and similar operations usually confined to machines having saws guidingly supported at both ends.

It will be observed that the pedestal construction affords a supporting means with a relatively wide base and with vertical members braced and stiffened by the lateral sides and the back of the box. Although the device is preferably relatively light and portable, the pedestal has that stiffness and freedom from joints so necessary in the direct driven saw operated at high speeds where the slightest misalignment or play would give rise to destructive vibration and hammering.

It will also be observed that the pedestal, in effect, is a continuation of motor platform 11, yet arranged so that motors of varying heights and base length may be employed in the operative unit.

A guide rod 27 extends through the upper and lower sides of the box 13 and a bifurcated arm 28 formed integral with the cap 23 is in sliding engagement with the rod to prevent turning of the tube or shaft 22.

For operatively connecting the saw to the motor means are provided which comprise, in this instance an arm or pin 29 formed integral with the cap 23 which acts as a pivot shaft and is connected by means of a connecting rod 30 to a balanced crank 31 on a shaft 32 of the motor 10.

The device is adapted to be driven by any suitable motor of any desired speed, the saw making one downward cutting stroke with each revolution of the motor. Lubricant passages 36' are provided in the pedestal 12 and provide means for adequately lubricating the reciprocatory tube 22 within the bosses 21. The passages may be filled with a suitable wicking or packing if so desired.

It is very important to note here that the saw blade 23 has the teeth filed away, and its end reduced backward as indicated at 38', so that the free end of the blade is tilted forward slightly and the downward travel of the blade in the holder is limited by the abutment formed at the upper end of the tapered portion, as shown in Figure 4. This has the effect of "freeing" the saw on the upper stroke and is very effective in preventing chattering or lifting of the worked material and so enables the use of a high speed saw on relatively thick material and with an ease of manipulation not heretofore possible. The blade is held in a U-shaped member 39 and secured in the cap 23 by the screw 24.

To aid in easily operating the present invention material guiding means are provided. Formed along one or more edges of the saw table 19 is a depending lip or flange 33 to which a slider 34 is removably and adjustably secured by a clamping element 35. Adjustably secured to the slider 34 by suitable means, in this instance, a bolt 36, is a guide 37 slotted as at 38 to permit suitable adjustments thereof relative to the slider. As shown the guide 37 is provided with a flat face to rest upon the table 19 and an upright face to contact and guide the material to be sawed. Figure 7 illustrates one adjustment of the guiding means for cross-cutting, and Figure 8, an adjustment of the guide means for ripping. Obviously the guide means may be adjusted to properly handle material of various sizes, both large and small.

From the foregoing it is apparent that I have provided a device of the class described herein which is adjustable to fit various sizes of motors, which has an adjustable table thereon, which aids in cutting material in various ways, which is provided with adjustable guiding means for the cutting of the aforesaid material, which is made of few and simple parts readily accessible, and which may be economically manufactured.

I am aware that many changes may be made, and numerous details of construction may be varied through a wide range without departing from the principles of this invention, and I therefore do not purpose limiting the patent granted thereon, otherwise than necessitated by the prior art.

I claim as my invention:

1. The combination with a motor platform having an upstanding support, a table having a pedestal adjustably secured to the said support, said pedestal having spaced bearings therein, a tube slidable in said bearings, a saw blade carried by said tube and extending above the said table, and a motor on the said platform having a driving connection with the said tube.

2. In combination with a motor platform having upturned slotted lugs at one end, a pedestal having a shallow box portion and depending and outturned arms adjustably secured to the said lugs and having an outturned and upturned arm adapted to adjustably support a table thereon, the said box portion of the pedestal having spaced bearings therein, a tube slidable in the said bearings, a saw blade carried by the said tube and a motor on said platform having a driving connection with the said tube.

3. In a device of the class described, a base, a motor on the base, a pedestal mounted on said base, said pedestal having a bearing thereon, a tube reciprocable in said bearing, driving means connecting said motor with said tube, a rod on said pedestal, and a member mounted on said tube having means for retaining a cutting element therein and having an extending arm slidably engaging said rod.

In testimony whereof I have hereunto subscribed my name at Chicago, Cook County, Illinois.

CARL S. BATES.